C. HOISINGTON.
Bog Cutter.
No. 39,048.    Patented June 30, 1863.
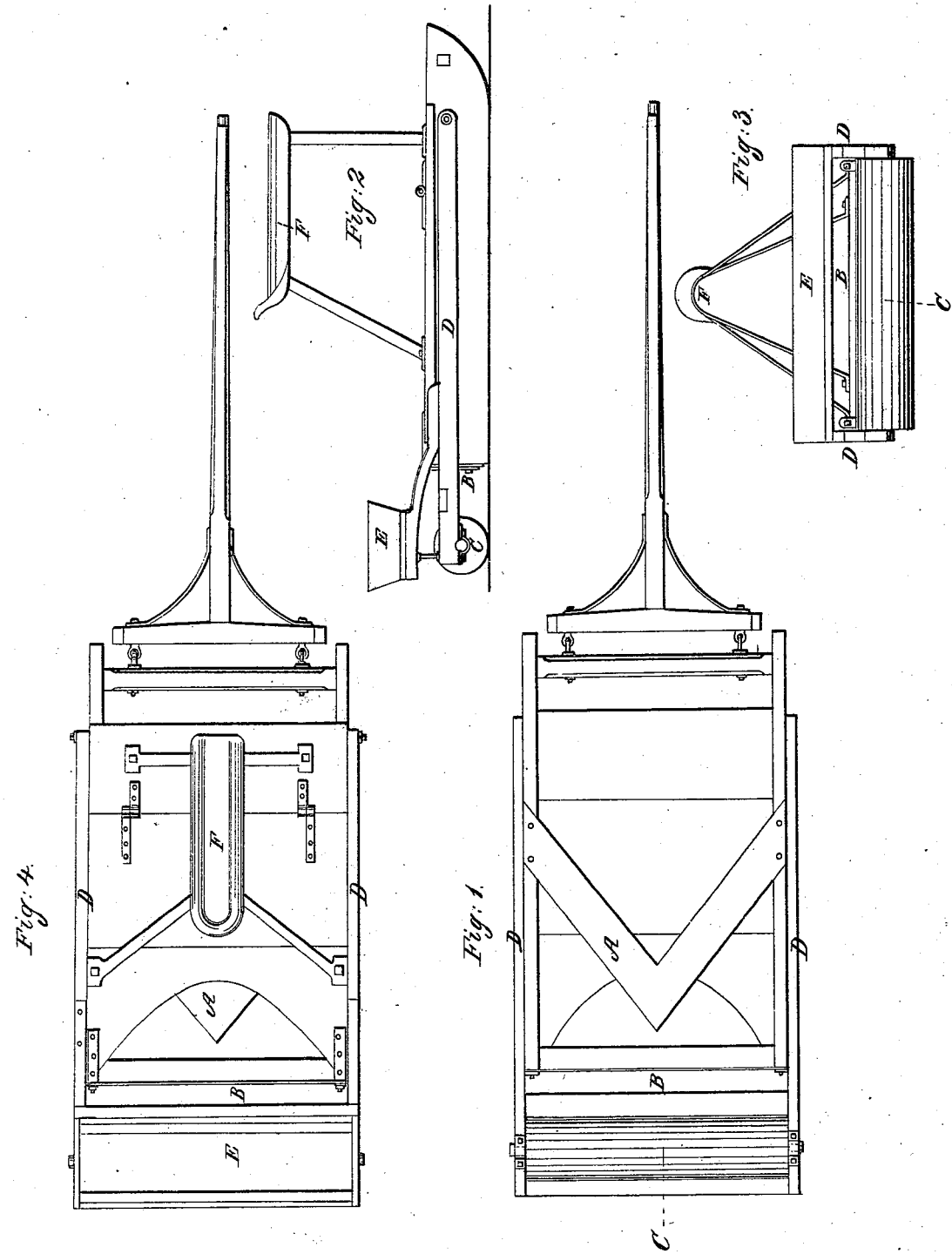
Witnesses:
J. A. Hoisington
Chanceller L. Jenks
Inventor:
Chester Hoisington

UNITED STATES PATENT OFFICE.

CHESTER HOISINGTON, OF SEWARD, ILLINOIS.

IMPROVEMENT IN BOG-CUTTING MACHINES.

Specification forming part of Letters Patent No. 39,048, dated June 30, 1863.

*To all whom it may concern:*

Be it known that I, CHESTER HOISINGTON, of the town of Seward, in the county of Winnebago, in the State of Illinois, have invented a new and useful Machine for Cutting off and Leveling the Bogs, Turfs, and other Inequalities in Meadows and other Lands, giving to the land a smooth and even surface, rendering it fit for mowing or reaping with machine, and for other purposes, the machine to be called "Hoisington's Western Bog-Shaver;" and I hereby declare that the following is a full, clear, and exact description of the construction and operation of the same, reference being had to the annexed drawings, making a part of this specification, in which—

Figure 1 is a bottom view. Fig. 2 is a side view. Fig. 3 is an end view, and Fig. 4 a top view.

To enable those skilled in mechanic arts to make and use my invention, I will describe it.

A is a steel knife or cutter, made of plow-share steel, about six inches wide, in shape of the letter V or an acute angle, with the inner edge made quite sharp by filing or grinding, attached horizontally to the bottom of the runners by spikes or bolts with countersunk heads. Bolts passing through the runners with screw and nut at the top of the runners would be preferable, (enabling one to remove the knife more easily for the purpose of sharpening or repairing,) the point of the knife to be set toward the hind end of the sled.

The runners are like a common board sled and need no description.

B is a wrought-iron or wooden scraper, attached to the hind end of the runners by means of bolts and nuts, so that it may be raised or lowered or removed entirely, as may be required by the nature of the work to be done.

C is a cast-iron or wooden roller, secured in a wooden frame, D, with shafts running each side of the sled, and fastened by an iron pin passing through the end of the shaft and near the fore end of the runners.

E is a wooden box on top of the frame D, to be loaded with stone to increase the weight of the roller when necessary.

F is a seat for the driver, placed lengthwise of the sled, so as to adjust the weight over the knife by the position of the driver. The width of the sled is about four feet, the length about six feet. Under the seat is a trap-door, with hinges for the purpose of more easily clearing the knife from obstructions.

The machine is to be drawn by horses or oxen over the meadow, the knife shaving ant-hills or bogs even with the ground, and may be used without the tongue. The scraper and roller may be dispensed with; but for leveling roads the scraper and roller should be used.

What I claim as my invention, and desire to secure by Letters Patent, is—

1. The sled provided with the knife A and seat F, as and for the purposes set forth.

2. In combination with the sled, the adjustable scraper B, constructed and operating as and for the purposes set forth.

3. The combination of the roller C, provided with box E, with the sled and scraper B, in the manner and for the purposes set forth.

CHESTER HOISINGTON.

Witnesses:
WERLEY R. GERHART,
DAVID C. INNIS.